United States Patent [19]
Shin et al.

[11] Patent Number: 5,585,912
[45] Date of Patent: Dec. 17, 1996

[54] IMAGE FORMING APPARATUS WITH MOVABLE MIRRORS ALONG TWO OPTICAL PATHS TO EXPOSE AN IMAGE ONTO A SELECTED PHOTOSENSITIVE DRUM

[75] Inventors: Hwa-sung Shin; Yong-kook Kim, both of Suwon, Rep. of Korea

[73] Assignee: Samsung Electronics Co., Ltd., Kyungki-do, Rep. of Korea

[21] Appl. No.: 563,594

[22] Filed: Nov. 28, 1995

[51] Int. Cl.$^6$ .................... G03G 15/01; G03G 15/04
[52] U.S. Cl. ....................... 355/326 R; 355/232
[58] Field of Search ........................... 355/232, 233, 355/240, 238, 326 R, 327; 347/232; 358/474, 487, 494, 497

[56] References Cited

U.S. PATENT DOCUMENTS

| | | | |
|---|---|---|---|
| 4,063,724 | 12/1977 | Suda | 271/277 |
| 4,615,612 | 10/1986 | Ohno et al. | 355/326 R X |
| 5,014,095 | 5/1991 | Yamada | 355/327 |
| 5,502,557 | 3/1996 | Choi et al. | 355/327 X |
| 5,517,296 | 5/1996 | Choi et al. | 355/326 R X |

*Primary Examiner*—Shuk Yin Lee
*Attorney, Agent, or Firm*—Leydig, Voit & Mayer

[57] ABSTRACT

An image forming apparatus includes a plurality of image forming units, each unit developing a latent image formed on a respective photosensitive drum with a respective color toner to form an image on a sheet of paper. The image forming apparatus includes an exposing optical device for projecting light on the photosensitive drums, a first movable mirror for reflecting the light along a first optical path and a second movable mirror for reflecting the light reflected from the first movable mirror to a selected photosensitive drum along a second optical path. The first and second movable mirrors move so that the optical path lengths are constant irrespective of the position of the selected photosensitive drum. Latent images, each having a uniform size, are formed on the photosensitive drums.

5 Claims, 5 Drawing Sheets

IMAGE FORMING APPARATUS WITH MOVABLE MIRRORS ALONG TWO OPTICAL PATHS TO EXPOSE AN IMAGE ONTO A SELECTED PHOTOSENSITIVE DRUM

FIELD OF THE INVENTION

The present invention relates to an image forming apparatus for forming an image on a sheet of paper from an original document or an image signal source and, more particularly, to an image forming apparatus for forming a multiple-color, one-color or monochrome image by using different color developers.

BACKGROUND ART

In order to print an image with an image forming apparatus such as a copy machine, printer or facsimile, first, a photosensitive material is exposed according to image information obtained from an original document or a predetermined image source, thereby forming a latent image. Then, a developer is utilized to apply toner to the latent image, in order to develop the image. The developed image is then transferred to and fixed on a sheet of paper.

To form a color image, respective developers for yellow, magenta, and cyan developing are generally used. In addition, a fourth developer for black developing is typically also utilized. Being contained in respective developing devices, different color developers are sequentially selected and the different color toners applied to portions of latent image of the photosensitive material and then transferred to a sheet of paper. Color image forming apparatus with a plurality of developers respectively containing the different color toners are divided into a fixed type image forming apparatus and a rotary type image forming apparatus according to the arrangement of the developing devices.

In the fixed type apparatus, a plurality of developing devices are radially disposed around a cylindrical photosensitive drum so that a selected developing device applies toner to the photosensitive drum at the fixed position of the developing device. An example of this type of apparatus is described in U.S. Pat. No. 4,063,724.

In the rotary type apparatus, the developing devices are radially incorporated in a rotator installed adjacent to the photosensitive drum. The rotator rotates so that the selected developing device moves to the development area of the photoconductive drum. An example of this type of apparatus is described in U.S. Pat. No. 4,615,612.

The fixed type apparatus may not be easily made into a compact apparatus because a large-diameter photosensitive drum is needed to provide sufficient space for positioning the plurality of developing devices. In addition, since the distances from the latent image on the photosensitive drum to the respective developing devices are different, the residual potential of the latent image is different at respective development devices. For this reason, the density of the respective colors developed is not uniform, thereby resulting in poor picture quality.

In the rotary type color image forming apparatus, at least one developing unit turns upside down when the rotator rotates, so the toner leaks and contaminates the interior of the apparatus. This is detrimental to the maintenance of the apparatus. Additionally, a high driving torque is required to drive the rotator. Therefore, when the rotator rotates, severe vibration and loud noise are generated, which prevent stable operation of the apparatus. This vibration results in poor picture quality.

U.S. Pat. No. 5,014,095 discloses another image forming apparatus that is different from the fixed and rotary types. This image forming apparatus comprises an elevation box in which four developing units are sequentially stacked. The elevation box is lowered or raised in the same manner as that of an elevator so that a developing unit selected on one side of a photosensitive drum moves to the development position of the photosensitive drum. In this type of apparatus in which the developing devices are lowered or raised, the problem of non-uniformity in image density due to different potentials of the latent image relative to respective developers is essentially eliminated and contamination due to the leakage of toner is prevented. However, making this type of apparatus more compact is difficult because sufficient space for moving the elevation box accommodating the developing devices is required. Further, a high driving torque is necessary, which is a hinderance to the stable operation of the apparatus for the reasons described above. Accordingly, enhancement of picture quality is not effective.

To solve the above described problems, an image forming apparatus comprising a new driving method disclosed in Korean patent application No. 94-1375 is utilized. This image forming apparatus comprises a structure providing for synchronously moving a relatively small and light transfer unit and an exposure unit, rather than fixing heavy and voluminous developers, thereby enabling the construction of a very compact apparatus with stable operation.

An image forming apparatus that is more stably driven by fixedly mounting an optical device of the exposure unit is disclosed in Korean patent applications Nos. 94-7658 and 94-7659, both of which have been incorporated into U.S. Pat. No. 5,532,816. In the apparatus disclosed in these patent applications, one rotating mirror and a plurality of fixed mirrors are used to reflect light projected from the exposing optical device onto respective photosensitive drums of the plurality of the image forming units.

Given that the optical path lengths from the exposing optical device to the respective photosensitive drums are different in the above exposure systems, the magnitudes of the latent images formed in the respective photosensitive drums are slightly different. As a result, an offset is generated in a color image transferred to a sheet of paper. A focusing operation required to solve the offset problem causes the optical device to be undesirably complicated.

SUMMARY OF THE INVENTION

Therefore, in order to overcome these problems, it is an object of the present invention to provide an image forming apparatus that can provide stable operation with a fixedly mounted exposing optical device, and that can form a high quality color image without having any offset by maintaining a constant optical path length from the exposing optical device to a respective photosensitive drum without modifying the optical device.

To accomplish the object of the present invention, there is provided an image forming apparatus comprising a plurality of image forming units, an exposing optical device, a transfer unit, a first movable mirror, a second movable mirror, and means for driving the first and second movable mirrors. Each of image forming units comprises a photosensitive drum for forming a latent image by exposure and a developing device for developing the latent image formed on the photosensitive drum. The exposing optical device projects light according to image information to expose the photosensitive drum. The transfer unit transfers the image on the drum to a sheet of paper. The first movable mirror is movable a first distance along a first optical path of the light projected from the exposing optical device for reflecting the light to a second optical path. The second optical path is parallel to the first optical path. The second movable mirror is movable a second distance along the second optical path for reflecting the light reflected by the first movable mirror to the respective photosensitive drum of the plurality of image forming units.

According to the present invention, a relatively heavy exposing optical device can be fixed rather than movable, thereby resulting in stable driving operation. Also, in the present invention, the first and second movable mirrors move synchronously to maintain the same optical path length from the exposing optical device to the photosensitive drum of a selected image forming unit. Thus, the magnitude of the latent image is formed on the photosensitive drum can be maintained with a high degree of uniformity. As a result, a high quality color image can be provided without any offset.

BRIEF DESCRIPTION OF THE DRAWINGS

The above object and advantages of the present invention will become more apparent by describing in detail a preferred embodiment with reference to the attached drawings in which.

DETAILED DESCRIPTION OF THE INVENTION

Preferred embodiments of the image forming apparatus of the present invention will be described below with reference to the attached drawings.

Figure 1:
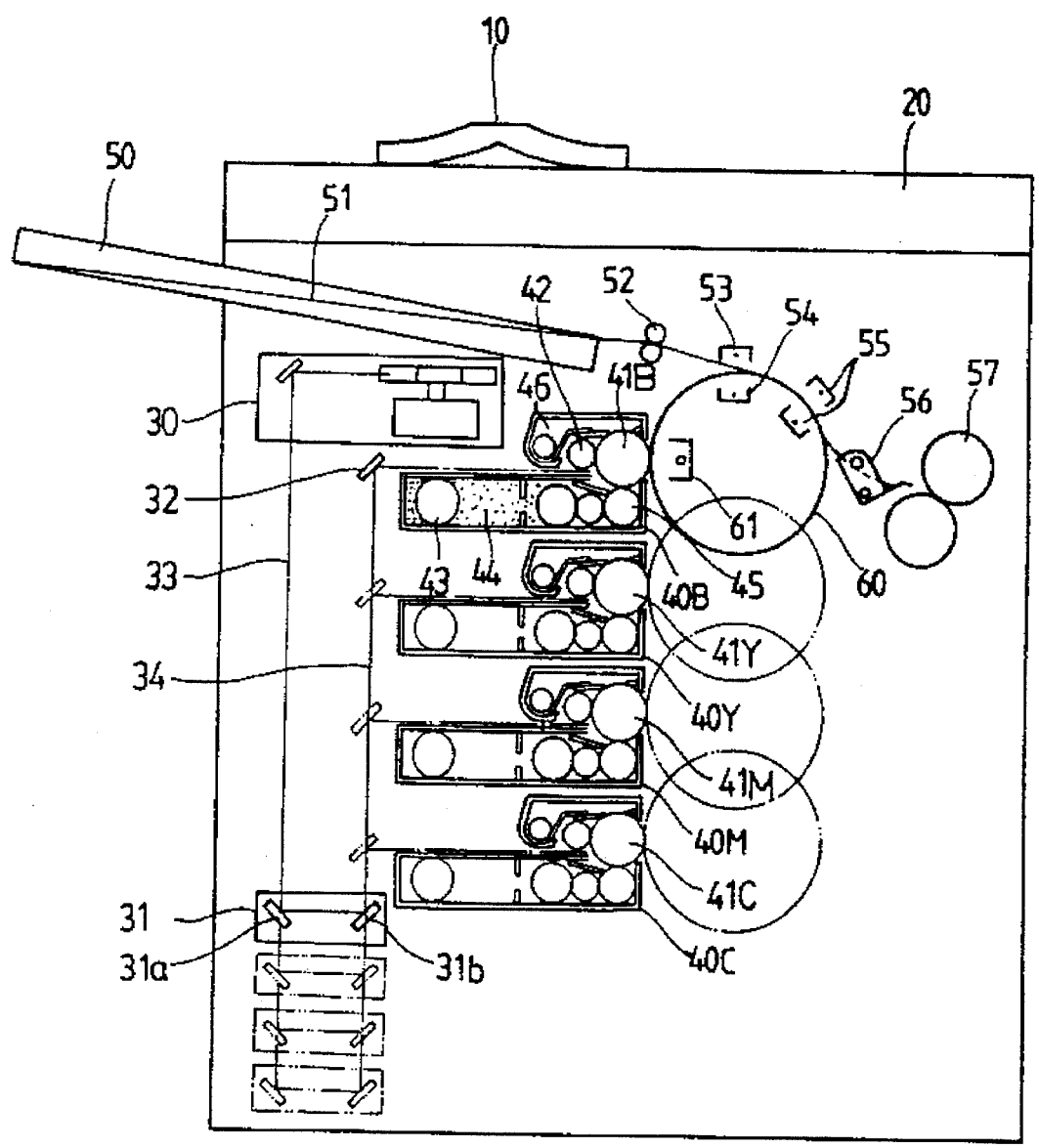
FIG. 1 is a side view of an image forming apparatus according to a first embodiment of the present invention.

FIG. 1 illustrates an exemplary first embodiment of an image forming apparatus according to the present invention. FIG. 1, shows an original document 10, a scanning unit 20, an exposing optical device 30, forming units 40B, 40Y, 40M and 40C for forming and developing latent images, respectively, a paper feeding cassette 50, and a transfer drum 60.

In the apparatus, the scanning unit 20, a general optical device for optically scanning the original document 10, outputs an electrical image signal corresponding to image information of the scanned original document 10 and transmits the signal to exposing optical device 30.

The exposing optical device 30 projects, for example, a laser beam according to the electrical image signal, and selectively exposes the photosensitive drums 41B, 41Y, 41M, and 41C in the image forming units 40B, 40Y, 40M, and 40C, respectively.

Each image forming unit 40B, 40Y, 40M, 40C includes a respective photosensitive drum 41B, 41Y, 41M, and 41C, a charging roller 42 for electrically charging each of the photosensitive drums 41B, 41Y, 41M, and 41C, a developing device 43 containing toner 44 and having a developing roller 45 for coating the respective photosensitive drums 41B, 41Y, 41M, arid 41C with toner 44, and a cleaner 46 for removing residual toner 44 remaining on the photosensitive drums 41B, 41Y, 41M, and 41C. The four image forming units 40B, 40Y, 40M, and 40C are stacked to provide a developed image comprising four colors, e.g., black, yellow, magenta and cyan, sequentially, from the top. Initially, the surface of each of the photosensitive drums 41B, 41Y, 41M, and 41C is uniformly electrically charged by its respective charging roller 42. An electrostatic latent image, that cannot be seen by the human eye, is formed on the surface portion of the particular photosensitive drum 41B, 41Y, 41M, and 41C where the electric potential is reduced by exposure to light from the exposing optical device 30. The developing device 43 rotates the developing roller 45 to adsorb internally contained toner 44 on the electrostatic latent image formed on the respective photosensitive drum 41B, 41Y, 41M, and 41C to develop the electrostatic latent image, thereby forming a visible image.

The paper cassette 50 contains sheets of paper 51 and supplies one sheet of paper at a time via the supply roller 52 toward the transfer drum 60. The sheet of paper 51 to be supplied is electrically charged by a paper charger 53 simultaneously with the electrical charging of the transfer drum 60 by the drum charger 54 so that the paper sheet is electrically adhered to the circumference of the transfer drum 60. The discharger 55 removes the remaining electrical charge on the sheet of paper 51 so that it may be separated from the transfer drum 60. A separator 56 separates the discharged sheet of paper 51 from the transfer drum 60 and guides it to exit an on the roller 57 for ejecting the sheet of paper 51 from the apparatus. The separator 56 is driven by a driving unit (not shown) so that it is separate from the transfer drum 60 at the beginning, and then comes into contact with the transfer drum 60 when the sheet of paper 51 is ejected after the image has been fixed onto the sheet of paper 51.

The transfer drum 60 comprises a transfer charger 61 in addition to drum charger 54 and discharger 55 that are lowered or raised together with the transfer drum 60.

Figure 2:
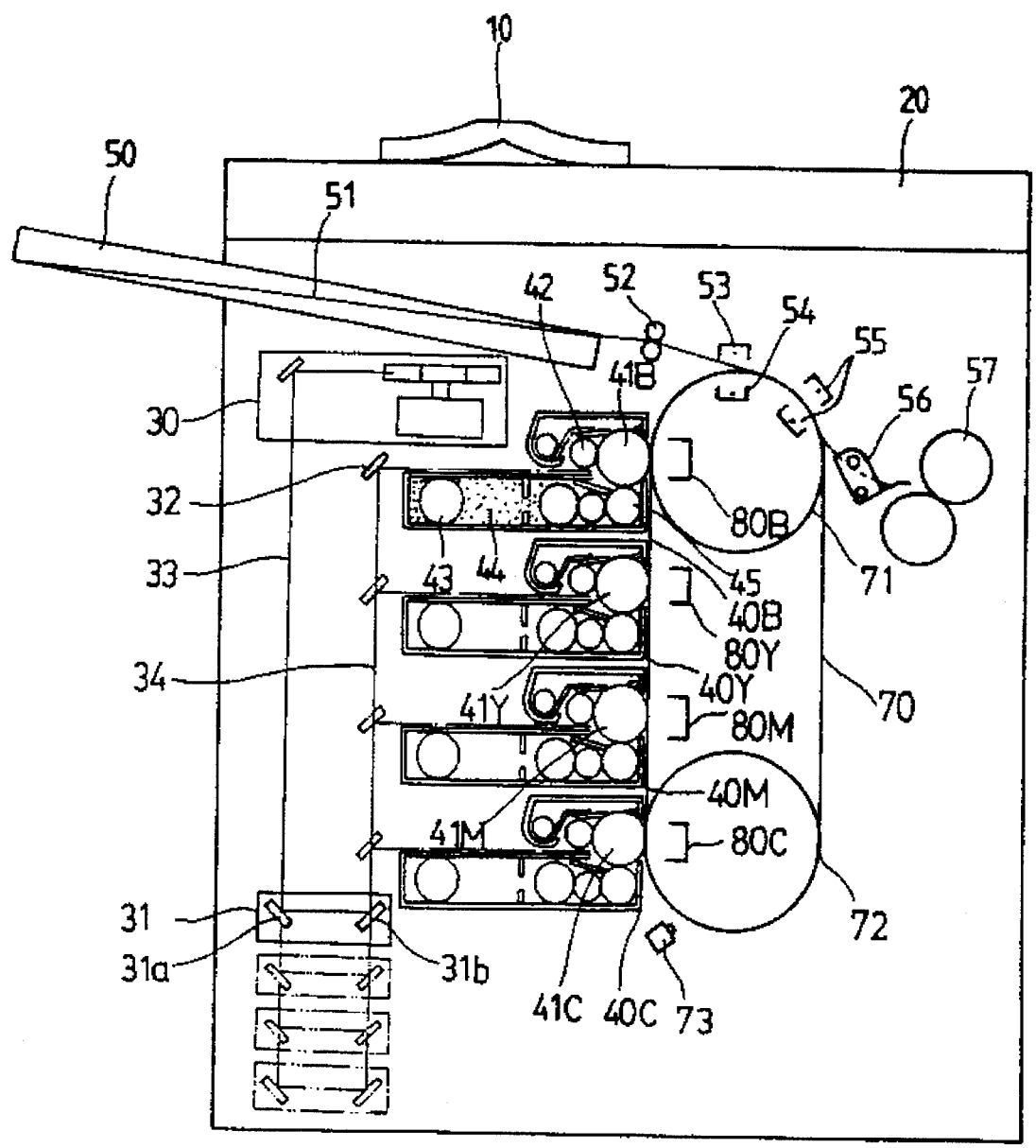
FIG. 2 is a side view of an image forming apparatus according to a second embodiment of the present invention.

FIG. 2 illustrates a second exemplary embodiment of the image forming apparatus according to the present invention. Here, the transfer drum 60 of FIG. 1 is replaced by a belt member 70. The belt member 70 is tensioned as an endless loop without any connection points between two lower and upper driving support rollers 71 and 72 that rotate to transport the sheet of paper 51 adhered thereto. Four transfer chargers 80B, 80Y, 80M, and 80C and a paper sensor 73 are disposed on the endless loop track of the belt member 70. The paper sensor 73 detects an end of the sheet of paper 51 that is transported by belt member 70 and generates an electrical signal in response. The electrical signal provides a basis on which an exposure start time and a developng start time are determined, after a predetermined time that is calculated in advance taking into account the distance from the sheet of paper 51 to a selected developing position and the transportation velocity. Chargers 80B, 80Y, 80M, and 80C are proximately installed opposing the photosensitive drums 41B, 41Y, 41M, and 41C in developing devices 40B, 40Y, 40M, and 40C. When the sheet of paper 51 passes the photosensitive drums 41B, 41Y, 41M, and 41C, power is applied to transfer an image developed on the respective photosensitive drums 41B, 41Y, 41M or 41C to the sheet of paper 51.

In FIGS. 1 and 2, the exposing optical device 30 is fixedly mounted parallel to the plurality of image forming units 40B, 40Y, 40M, and 40C. First and second movable mirrors 31 and 32 are provided to expose each photosensitive drum 41B, 41Y, 41M, or 41C in the plurality of image forming units 40B, 40Y, 40M and 40C to have the same optical path length from the exposing optical device 30. In other words, the first and second movable mirrors 31 and 32 move in a predetermined relationship to each other to maintain an equal optical path length between each photosensitive drum 41B, 41Y, 41M, and 41C and the exposing optical device 30. The light projected from the exposing optical device 30 to the first movable mirror 31 travels along a first optical path, and the light reflected from the first movable mirror 31 to the second movable mirror 32 travels along a second optical path. The first movable mirror 31 includes two mirrors 31a and 31b so that light projected from the exposing optical device 30 is reflected to a second optical path 34 that is parallel to the first optical path 33. The second movable mirror 32 is a single mirror for reflecting the light reflected from second optical path 34 to a selected photosensitive drum 41B, 41Y, 41M, and 41C. Each of the first and second movable mirrors 31 and 32 move along the first and second optical paths 33 and 34 so that the same optical path lengths between the exposing optical device 30 and each photosensitive drum 41B, 41Y, 41M, and 41C is maintained. The moving conditions of the first and second movable mirrors 33 and 34 will be described with reference to FIG. 3.

Figure 3:
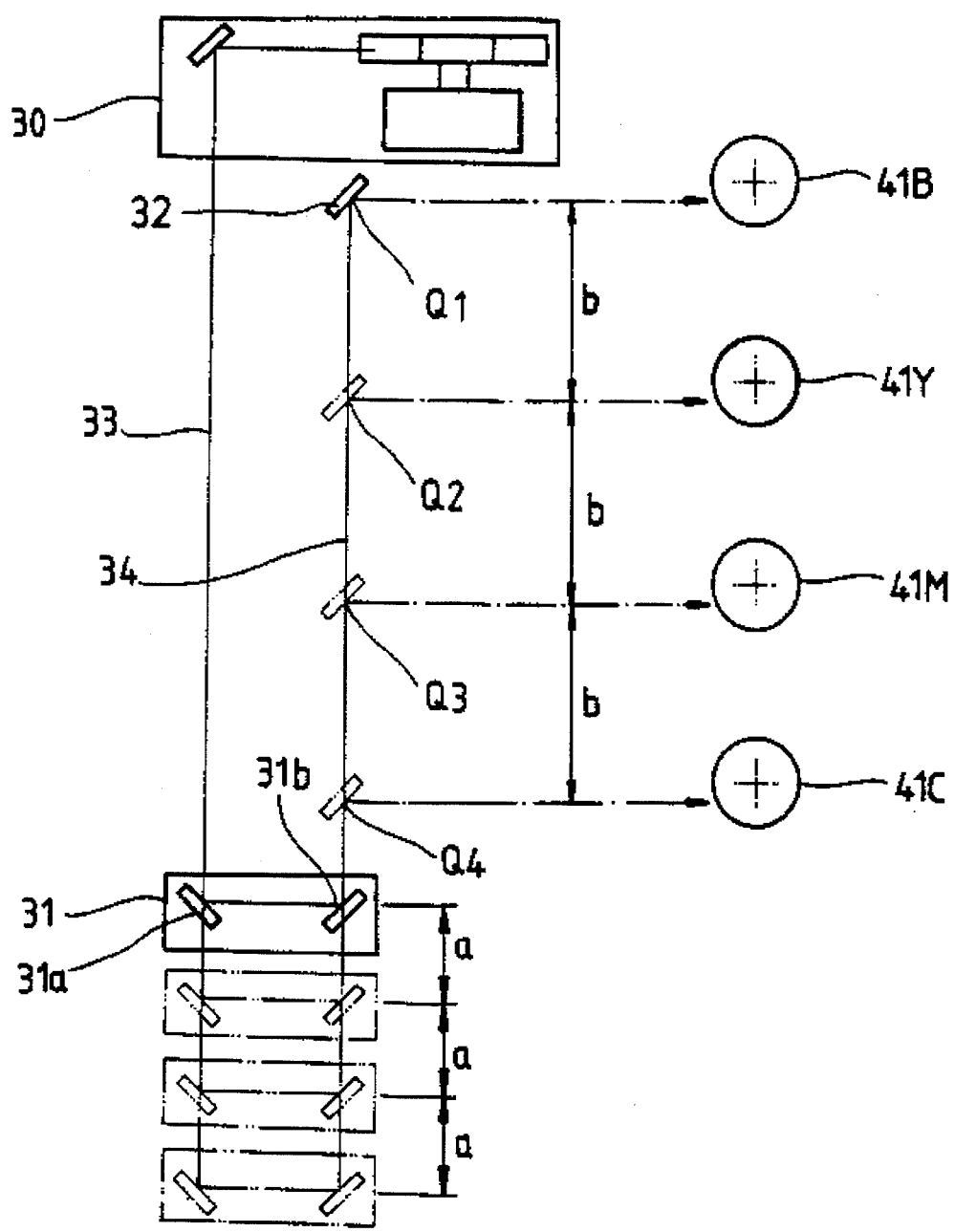
FIG. 3 is a diagram illustrating the arrangement of mirror members disposed between the exposing optical device and the photosensitive drum shown in FIGS. 1 and 2.

As illustrated in FIG. 3, the second movable mirror 32 sequentially moves to points Q1, Q2, Q3, and Q4 where the second optical path 34 of the light reflected from the second mirror 31b of the first movable mirror 31 meets each exposing optical path of the photosensitive drums 41B, 41Y, 41M, and 41C. Accordingly, the first movable mirror 31 also moves in the same direction as the second movable mirror 32. The first movable mirror 31 moves a distance "a" and the second movable mirror 32 moves a distance "b", wherein a is one-half b, i.e., a is ½b. Accordingly, as the second movable mirror 32 moves from point Q1 to point Q4, the first movable mirror 31 moves simultaneously with it, but at half the distance each time to expose the photosensitive drums 41B, 41Y, 41M, 41C with light traveling the same distance. As a result, the optical path lengths from the exposing optical device 30 to the photosensitive drums 41B, 41Y, 41M, and 41C are the same for forming a latent image of the same magnitude on each photosensitive drum.

Figure 4:
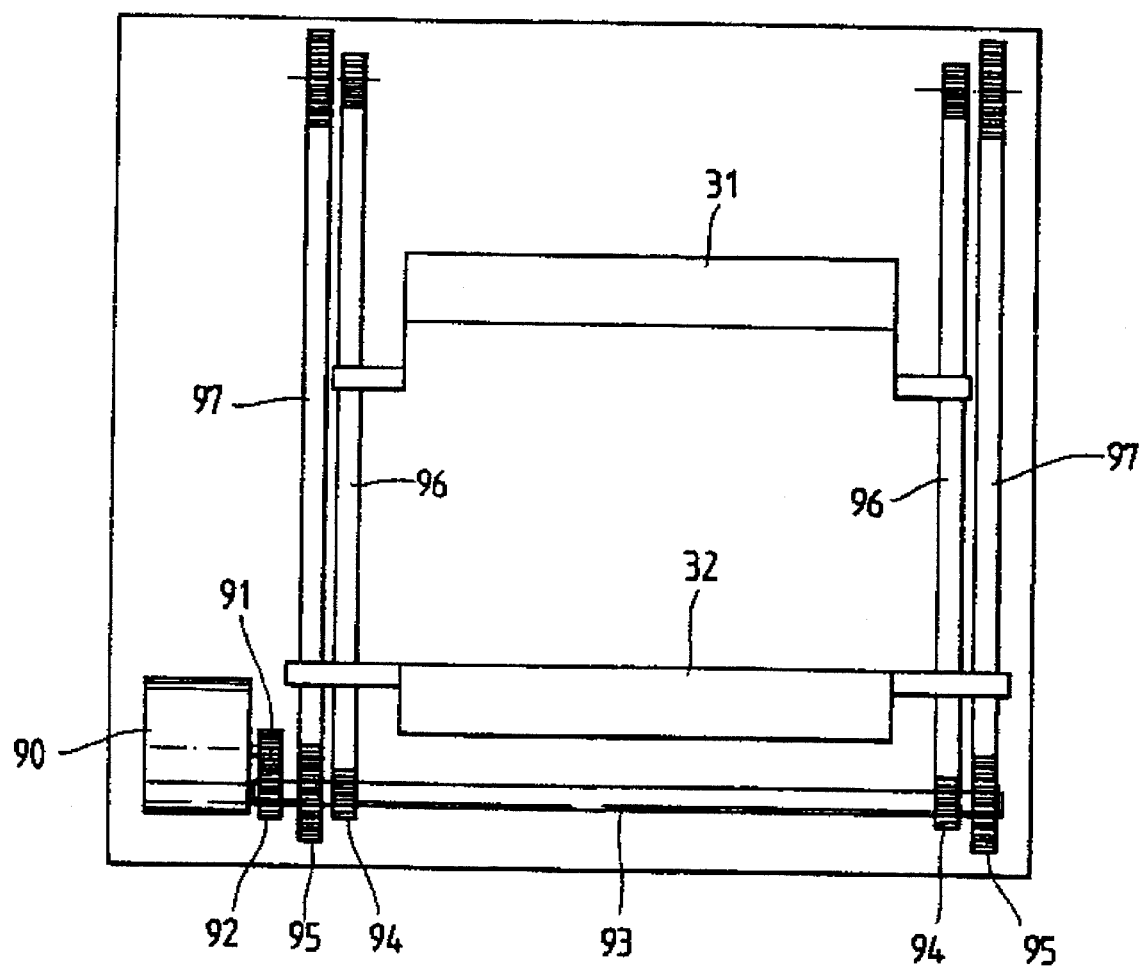
FIG. 4 is a front view illustrating a first structure for moving the first and second movable mirrors illustrated in FIG. 3.
Figure 5:
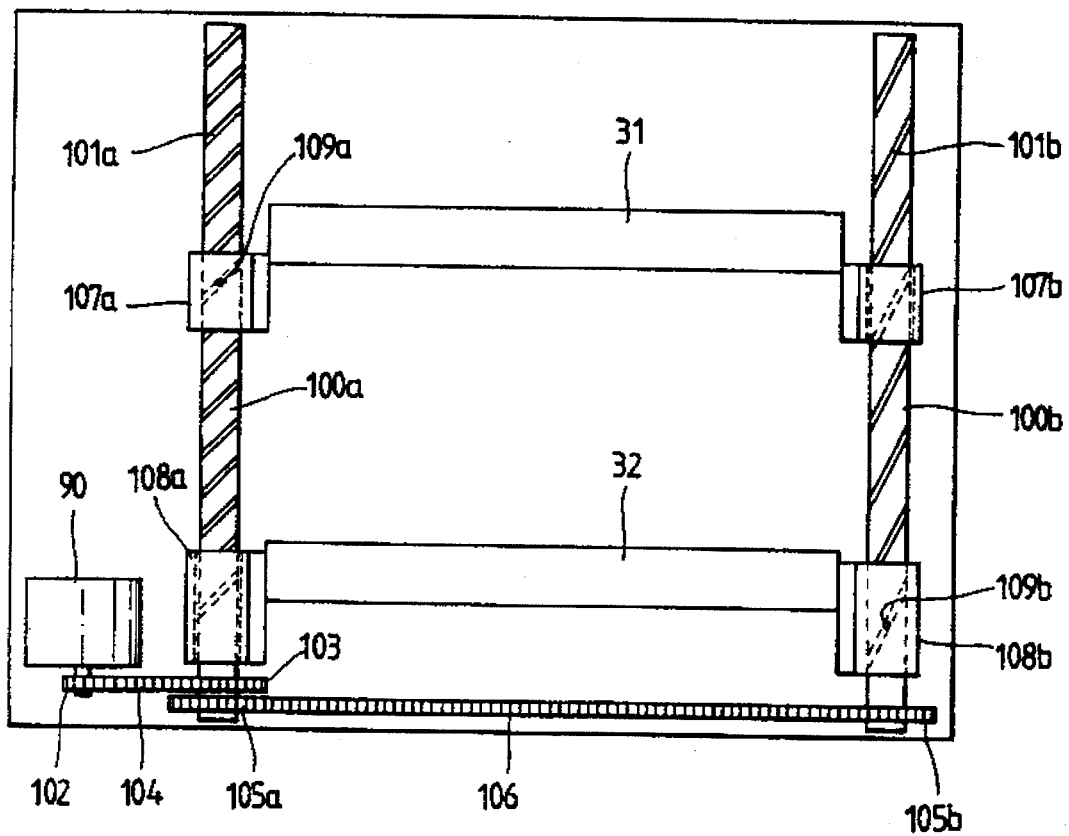
FIG. 5 is a front view illustrating a second structure for moving the first and second movable mirrors illustrated in FIG. 3.

FIGS. 4 and 5 show a detailed example of a driving unit for moving the first and second movable mirrors 31 and 32 together, utilizing a single driving source. Referring to FIG. 4, a motor 90 is connected to a rotating shaft 93 via connection gears 91 and 92. A pair of gear pulleys 94 and 95 are connected to opposite ends of the rotating shaft 93 and a pair of timing belts 96 and 97 are connected to the gear pulleys 94 and 95, respectively. The first and second movable mirrors 31 and 32 are attached to the timing belts 96 and 97. The diameter of the gear pulley 94 for moving the first movable mirror 31 is half the diameter of the other gear pulley 95 for moving the second movable mirror 32. During operation, as the motor 90 operates, the gear pulleys 94 and 95 rotate together with the connection gears 91 and 92, and two pairs of timing belts 96 and 97 travel to move the first and second movable mirrors 31 and 32. Here, since the diameter of the gear pulley 95 is half the diameter of the other gear pulley 94, the first movable mirror 31 moves half of the movement distance of the second movable mirror 32.

Next, referring to FIG. 5, two lead screws 100a and 100b having two lead screw grooves 101a and 101b and different lead angles are provided in ends of the first and second movable mirrors 31 and 32. One lead screw 100a rotates via connection gears 102 and 103 and a timing belt 104 driven by the motor 90 and the other lead screw 100b rotates in the same manner as the lead screw 100a, driven by gears 105a and 105b and a timing belt 106 connecting both gears 105a and 105b. The first and second movable mirrors 31 and 32 move linearly along the lead screws 100a and 100b in screw holders 107a and 108b and guides 107b and 108a that are movably connected to the lead screws 100a and 100b, respectively. The screw holder 107a of the first movable mirror 31 and the other screw holder 108b of the second movable mirror 32 have interlocking pins 109a and 109b interlocked with screw grooves 101a and 101b of the lead screws 100a and 100b, respectively. That is, the first movable mirror 31 moves linearly together with the rotation of the lead screw 100a, and second movable mirror 32 moves linearly with the rotation of the lead screw 100b. Here, the lead distance of the lead screw 100a is half of the lead distance of the lead screw 100b. Thus, if two lead screws 100a and 100b rotate together, the first movable mirror 31 moves half of the distance of movement of the second movable mirror 32.

As described above, the present invention uses a plurality of simple mirrors for controlling the optical path length for an exposing optical device. Accordingly, the exposing optical device does not need to move and the optical path length from the exposing optical device to a respective photosensitive drum is maintained, to produce a uniform magnitude latent image on each of the photosensitive drums. Thus, the present invention achieves more stable operation to generate little noise and provide a high quality image.

What is claimed is:

1. An image forming apparatus for forming an image on a sheet of paper comprising:

a plurality of image forming units, each image forming unit having a photosensitive drum for forming a latent image by exposure and a developing device for developing the latent image formed on the photosensitive drum;

an exposing optical device for projecting light according to image information to expose the photosensitive drum, the exposing optical device being fixed in position in the image forming apparatus;

a transfer unit for transferring an image developed on a photosensitive drum to a sheet of paper;

a first movable mirror movable a first distance along a first optical path of the light projected from the exposing optical device for reflecting the light to a second optical path, the second optical path being parallel to the first optical path;

a second movable mirror movable a second distance along the second optical path for reflecting the light reflected by the first movable mirror to the respective photosensitive drums of the plurality of the image forming units; and means for driving the first and second movable mirrors along the first and second optical paths.

2. The image forming apparatus according to claim 1, wherein the first movable mirror comprises two reflection mirrors.

3. The image forming apparatus according to claim 1, wherein the first movable mirror moves half the distance that the second movable mirror moves.

4. The image forming apparatus according to claim 1, wherein the means for driving comprises a motor, a rotating shaft coupled to and rotated by the motor, two gear pulleys having different diameters and installed on opposite ends of the rotating shaft, and timing belts connected to the gear pulleys, the first and second movable mirrors being attached to the timing belts.

5. The image forming apparatus according to claim 1, wherein the means for driving comprises a motor, a rotating shaft coupled to and rotated by the motor, two lead screws, the lead screws having different pitches and rotated by the motor, and two screw holders movably connected to the two lead screws, supporting the first and second movable mirrors, and interlocked with the screws.

\* \* \* \* \*